Patented Mar. 30, 1954

2,673,817

UNITED STATES PATENT OFFICE 2,673,817

CORROSIONPROOF TANK LINING AND PROTECTIVE COATING

Arthur E. Burns, Jr., Riverside, Calif., assignor to Hart and Burns, Incorporated, Riverside, Calif., a corporation of Texas No Drawing. Application August 1, 1947, Serial No. 765,643

12 Claims. (Cl. 117—62)

This invention pertains to methods of protecting ferrous metals from corrosion and is particularly directed to methods and means whereby tanks, pipe, tubing, casing and other metallic objects exposed to petroleum products and to the action of saline solutions may be protected from corrosion, pitting, electrolysis, etc.

Very severe corrosion problems arise when steel or iron surfaces are periodically exposed to the action of salt waters. The problem of protecting such metallic objects and surfaces is rendered more difficult when such surfaces are alternately exposed to petroleum products, such as gasoline, and then to saline solutions, because although the saline solutions accelerate the corrosion, the petroleum distillate or other petroleum product deleteriously affects and generally destroys the completeness and integrity of any orthodox paint or surface coating which may have been applied to the surface in an attempt to protect it against corrosion.

A particularly difficult problem is encountered in the tanks or compartments of tanks which are used to transport gasoline, although similar problems are encountered in many other instances in the petroleum industry, for example in field storage tanks and in the drilling and development of oil wells through so-called salt domes or wherever the oil body is in contact with brines or saline solutions.

The tanks or compartments of tankers used in the transportation of gasoline are generally emptied by pumping sea water into the lower portions of the tanks, thereby flooding the gasoline to the surface and displacing it out of the tank. Even if other methods of removing the gasoline from the tanks are employed it is customary to fill the tanks with sea water for the return voyage, the sea water acting as ballast. Under these conditions, corrosion is so rapid that the bulkheads, walls, plating stiffeners and other metallic members are severely weakened and the tank rendered useless within a short time.

Some attempts have been made to coat or line the internal surfaces of these tanks with various organic, synthetic and other paints or coating preparations but none of them has been successful because the solvent properties of the gasoline are great and coatings do not withstand the action of the gasoline.

It is also to be remembered that such tanks or storage compartments must be inspected and cleaned periodically and it is customary to purge these tanks or compartments with hot steam or other hot water to eliminate and drive out gasoline vapors in order to permit personnel to enter the tanks or compartments. The steam or hot water also weakens and in many instances destroys the protective capacity of whatever coating has been used on the walls.

The above examples illustrate the radical conditions which have made the problem an insurmountable one in the past. It is evident that whatever coating is employed must withstand the alternate exposure to sea water and petroleum distillates; it must also withstand appreciatble changes in temperature and the action of hot steam; it must also be able to withstand the abrasive action of shovels and scrapers which may be used in scraping or cleaning the tanks.

The present invention is directed to a method whereby a coating can be applied to the metallic surfaces to be protected and there converted into a substantially water-insoluble, hard, abrasion-resistant, protective film which resists corrosion, mechanical abrasion, steam vapors, and the action of petroleum distillates.

Generally stated, the invention contemplates the application of a mixture of hydrous, alkali, silicate and comminuted metallic zinc to the surfaces to be protected, this relatively soluble mixture being then converted into a set, hard mass which is insoluble even in boiling water, by treatment with a chemical solution or hardening agent which converts the mixture into a complex zinc silicate.

It is an object of the present invention, therefore, to disclose and provide a method of protecting ferrous metals from corrosion.

A further object of the invention is to disclose and provide a method of protecting ferrous metals from corrosion due to alternate exposure of said surfaces to the action of petroleum fractions and sea water or brine.

Another object of the invention is to disclose and provide a coating composition which is resistant to the action of gasoline, kerosene and other petroleum distillates and which can be converted into a substantially water-insoluble, heat-resistant protective coating capable of withstanding the action of sea water or brines while it is on the metallic surfaces.

A still further object of the invention is to disclose and provide means and methods whereby a complex zinc-alkali-silicate coating capable of resisting the action of steam, petroleum products and sea water may be formed upon the surfaces of tanks, pipe, casing or other metallic objects used in the drilling, production or transportation of petroleum products.

These and other objects, uses, advantages and adaptations of the invention will become apparent to those skilled in the art from the following more detailed description of illustrative materials and forms of procedure contemplated by this invention.

As indicated hereinabove, the method of the present invention contemplates the application of a mixture of powdered or finely divided metallic zinc and an alkali silicate to the surfaces to be protected, followed by the step of indurating, insolubilizing and stabilizing of such coating. The preparation originally placed upon the surfaces to be protected preferably employs hydrous alkali silicates having a high silicate ratio. Such silicates are generally referred to as of the acid type. Sodium or potassium silicates may be used but they should have a molecular ratio of more than 2, and preferably between 3 and 4 $SiO_2$, to 1 of alkali ($Na_2O$ or $K_2O$). Such silicates contain a relatively high proportion of combined or difficultly removable water, that is, from about 15 to as much as 100 mols of $H_2O$ per $K_2SiO_3$ or $Na_2SiO_3$ as a solid. Examples of suitable hydrous alkali silicates which have been successfully used are as follows: a sodium silicate of 33.5° Bé. containing about 6.3% $Na_2O$, 24.6% $SiO_2$ and 69.1% $H_2O$ sold under the name "S Brand"; and a potassium silicate of 29° Bé. which contains about 7.8% $K_2O$, 19.6% $SiO_2$ and 72.6% $H_2O$ sold under the name "Kasil No. 1." Both of these brands of silicates are sold by the Philadelphia Quartz Company of Philadelphia, Pennsylvania. It is to be understood that specific reference is made to these products as illustrative only; a material deviation from the proportions of components is contemplated.

The metallic zinc employed should be in powdered or flake form. Zinc dust No. 22 has been used with good results. Such metallic zinc is then incorporated in the hydrous alkali silicate with accompanying agitation or milling and the proportions may be varied within relatively wide limits. Ordinarily the comminuted metallic zinc is added in quantities sufficient to furnish 50 to 250 parts of zinc by weight to which 10 parts of $K_2SiO_3$ or $Na_2SiO_3$ as a solid is added. Such proportions generally result in a pasty mass or thick slurry. Additional water may be incorporated in the mixture for the purpose of controlling the workability or viscosity of the mixture, the amount of water being variable in accordance with the Baumé of the silicate employed, the proportion of powdered metallic zinc added, and the manner in which the resulting mixture is to be applied. The mixture may be applied by brushing, troweling or even by spraying upon the surfaces to be protected. In some instances as hereafter stated, the mixture may be pumped into position.

Before application to the surfaces to be protected, such surfaces in most instances should be cleaned and if possible sandblasted so as to furnish a suitable surface to which the composition will firmly adhere. After application of the composition to such surface, the composition is preferably permitted to air dry or attain an initial set, it being understood that such air drying will not result in an anhydrous coating because of the difficulty with which the silicates lose their water content.

In the event the composition has been applied to a storage tank, whether on a tank farm or within a tanker or other vessel, such tank may be loaded immediately with the petroleum product, be it fuel oil, kerosene or gasoline. The coating is insoluble in petroleum products. The hardening or induration of the coating and its chemical conversion into an insoluble stable film or coating may await the discharge of such tank or compartment and the flooding of such compartment with a hardening or treating agent such as sea water. It has been discovered that the mixture of powdered or comminuted zinc and alkali silicate may be converted into a complex zinc-alkali-silicate by treatment with a variety of aqueous solutions. All of these solutions should be relatively dilute and preferably have a pH of between 4 and 7 or 8.5. Sea water, sodium bicarbonate, potassium acid sulfate, zinc chloride, calcium chloride, potassium acid phthalate and many other treating agents, in the form of relatively dilute solutions, may be used. Sodium acetate-acetic acid solutions, and other buffered solutions can also be used.

When ordinary sea water is employed, the hardening of the initial coating may be delayed until the tank has been emptied of its gasoline by displacement with a salt brine or sea water. Such brine or sea water should then be maintained in contact with the coating for a period of from about 48 hours to 96 hours, depending somewhat upon the concentration or saline content of such sea water. Contact of sea water with the coating for a much greater length of time will have no deleterious effects, but on the average approximately 72 hours' contact with sea water is necessary in order to thoroughly harden, indurate and insolubilize the coating so that it will not peel, soften or disintegrate under the action of steam or boiling water.

In many instances the original coating may be subjected to the action of a treating solution such as, for example, a 1% sodium bicarbonate solution, before the tank or other metallic object is placed in use. It has been found that a 1% sodium bicarbonate solution will thoroughly indurate and solubilize the coating and cause the development of a complex zinc-alkali-silicate in a period of 24 hours. A 1% zinc chloride solution also requires approximately 24 hours to produce the desired effect. A 1% potassium acid phthalate solution or a 1% potassium acid sulfate solution will produce the desired reaction in a much shorter period of time, namely, about 15 or 20 minutes.

The entire tank or compartment (after its surfaces have been coated) may be flooded with the treating agent solution, or the walls of such tank or compartment may be sprayed with the treating solution for a period of time in order to permit the reaction to take place without the necessity of using large volumes of such treating solution. When spraying is employed, a portable pump, together with suitable spray nozzles connected thereto, may be placed in the bottom of a tank or compartment, the pump delivering the treating solution from the bottom of the tank to the nozzles, which then spray the walls and roof, the drainage from such walls collecting in the bottom of the tank for recirculation by the pump.

As previously stated, the quantity of zinc originally used is in excess of that required to form the final complex zinc-alkali-silicate. During the treatment with the indurating solution, a certain amount of zinc appears to dissolve. The treating solution apparently activates the zinc so that it combines with the silicate. For these reasons, treating solutions having a pH of between about 4 and 8.5 and of the buffered type are preferred.

After such treatment, the resulting indurating coating resists not only the action of petroleum products but is insoluble in either cold or hot water and is unaffected by the action of steam.

In the description given hereinabove, particular attention has been drawn to the use of the coating on the wall surfaces and other steel or iron members (such as ladders, braces, etc.) which may exist in tanks. The invention is not limited thereto, however, since it may be used with great advantage in the treatment of oil well casing, drill pipe, production pipe, tubing, etc. In many instances, oil wells are drilled through salt domes or into formations carrying large volumes of salt water and such salt water rapidly corrodes the casing or pipe. In many instances a string of pipe which has perforated a stratum bearing salt brine is corroded and either the oil produced from such well thereafter contains an excessive amount of salt water or the entire well has to be abandoned. The cementing of such strings of pipe for the purpose of shutting off the stratum bearing the salt water has not been successful since the cement does not prevent the corrosive action of the brine upon the pipe. When such conditions are encountered, this invention contemplates the placement of a mass of hydrous alkali silicate and metallic zinc around the pipe or casing by pumping such mixture into the desired position in very much the same way that a cementing operation is normally carried out. This mixture will, under the action of the brine, be converted into the complex zinc-alkali-silicate which acts to stop corrosion by galvanic action.

Instead of pumping a large body of material into position around a drill pipe as hereinbefore described, the external surfaces of the drill pipe (or both internal and external surfaces thereof) may be provided with a protective coating in the manner of this invention and from the composition herein disclosed, before such drill pipe is set in the well hole. A coating measuring only 0.01 inch in thickness will adequately resist the corrosive action of salt water.

The advantages and economies of the mode of operation herein disclosed will be readily apparent to those skilled in the art. It will be noted that no special equipment is needed in applying the composition nor is it necessary to heat or bake the coating to develop the resistive properties thereof. In addition to the specific examples given, it will be evident that the coating preparation and method of induration is applicable to many other uses. Metals exposed to the action of sea spray (as in lighthouses, power lines along the sea coast, etc.) may be protected by the coating embraced by this invention.

All changes and modifications coming within the scope of the appended claims are included therein.

I claim:

1. In a method of protecting metallic objects from corrosion, the steps of: applying to the surface to be protected a coating composed essentially of an aqueous solution of alkali silicate and finely divided metallic zinc, the zinc constituting between about 75% and 96% of the mixture on a dry basis, and treating said coating with a dilute aqueous saline solution having a pH of between 4 and 8.5 to produce a complex zinc-alkali-silicate in situ.

2. A method of protecting metallic objects from corrosion, which comprises: covering the surface to be protected with a film consisting of a mixture of an aqueous solution of alkali silicate of the acid type having a molecular ratio of not less than 3 $SiO_2$ to 1 of alkali and an excess of finely divided metallic zinc, and then converting said film into a hard surfacing insoluble in hot water by treatment of the film with a dilute aqueous saline solution adapted to solubilize a part of the zinc with concurrent generation of hydrogen, said saline solution having a pH of between 4 and 8.5, for a period of time sufficient to produce a zinc-alkali-silicate in situ.

3. A method of the character stated in claim 2 wherein the mixture contains between 50 and 250 parts of zinc per 10 parts of the alkali silicate as a solid.

4. A method of protecting well casing in well bores containing saline waters which comprises: pumping into the well bore a pumpable body of a mixture of an aqueous solution of alkali silicate of the acid type, having a molecular ratio of not less than 3 $SiO_2$ to 1 of alkali, and an excess of finely divided metallic zinc, to place such body between the casing and walls of the bore in the area where salt waters are entering the well bore, whereby said mixture is indurated by the salt waters and the casing is protected against corrosion.

5. A method of the character stated in claim 2 wherein the reagent is sea water.

6. A method of the character stated in claim 2 wherein the reagent is sodium bicarbonate.

7. A method of the character stated in claim 2 wherein the reagent is calcium chloride.

8. In a method of protecting metallic objects from corrosion, the steps of: applying to the surface to be protected a coating composed essentially of an aqueous solution of, alkali silicate and finely divided metallic zinc, the zinc constituting between about 75% and 96% of the mixture by weight on a dry basis, and treating said coating with sea water to indurate such coating.

9. In a method of protecting metallic objects from corrosion, the steps of: applying to the surface to be protected a coating composed essentially of an aqueous solution of alkali silicate and finely divided metallic zinc, the zinc constituting between about 75% and 96% of the mixture on a dry basis, and treating said coating with sea water for a period of not less than 48 hours to indurate the coating.

10. In a method of protecting metallic objects from corrosion, the steps of: applying to the surface to be protected a coating composed essentially of an aqueous solution of, alkali silicate and finely divided metallic zinc, the zinc constituting between about 75% and 96% of the mixture by weight on a dry basis, and treating said coating with a salt solution having a pH of between 4 and 8.5.

11. A method of protecting well casing and well bores containing saline waters which comprises: pumping into the well bore a pumpable body of a mixture of an aqueous solution of alkali silicate of the acid type, having the molecular ratio of not less than 3 $SiO_2$ to 1 of alkali and an excess of finely divided metallic zinc, the zinc constituting between about 75% and 96% of the mixture by weight on a dry basis, to place such body between the casing and the walls of the bore in the area where salt waters are entering the well bore and indurating said mixture by naturally occurring salt waters in said area, whereby the casing is protected against corrosion.

12. A method of protecting the metallic walls of tankers from alternate exposure to petroleum distillation, sea water, steam and abrasion which comprises: applying to the metallic walls of an oil tank a viscous mixture of alkali silicate in an aqueous solution and finely divided metallic zinc, the zinc constituting between about 75% and 96% of the mixture by weight on a dry basis, the alkali silicate having a molecular ratio of not less than 3 $SiO_2$ to 1 of alkali, and thereafter treating the coating so applied with a dilute aqueous saline solution having a pH of between 4 and 8.5 to solubilize a portion of the zinc with concurrent generation of hydrogen and to form a hard abrasion-resistant, protective film on said walls, said film being capable of protecting the walls from corrosion.

ARTHUR E. BURNS, JR.

References Cited in the file of this patent

UNITED STATES PATENTS

| Number | Name | Date |
|---|---|---|
| 419,657 | Gesner | Jan. 21, 1890 |
| 1,602,726 | Turk | Oct. 12, 1926 |
| 1,613,758 | Lindstrom | Jan. 11, 1927 |
| 2,440,969 | Nightingall | May 4, 1948 |
| 2,462,763 | Nightingall | Feb. 22, 1949 |
| 2,509,875 | McDonald | May 30, 1950 |

FOREIGN PATENTS

| Number | Country | Date |
|---|---|---|
| 304,355 | Great Britain | Jan. 21, 1929 |

OTHER REFERENCES

Joglum, Properties of Soluble Silicates, page 5 of reprint from Chemical Industries for October 1941.